Jan. 4, 1944. A. BOOR 2,338,162
SHOCK ABSORBER
Filed Sept. 5, 1941 2 Sheets-Sheet 1
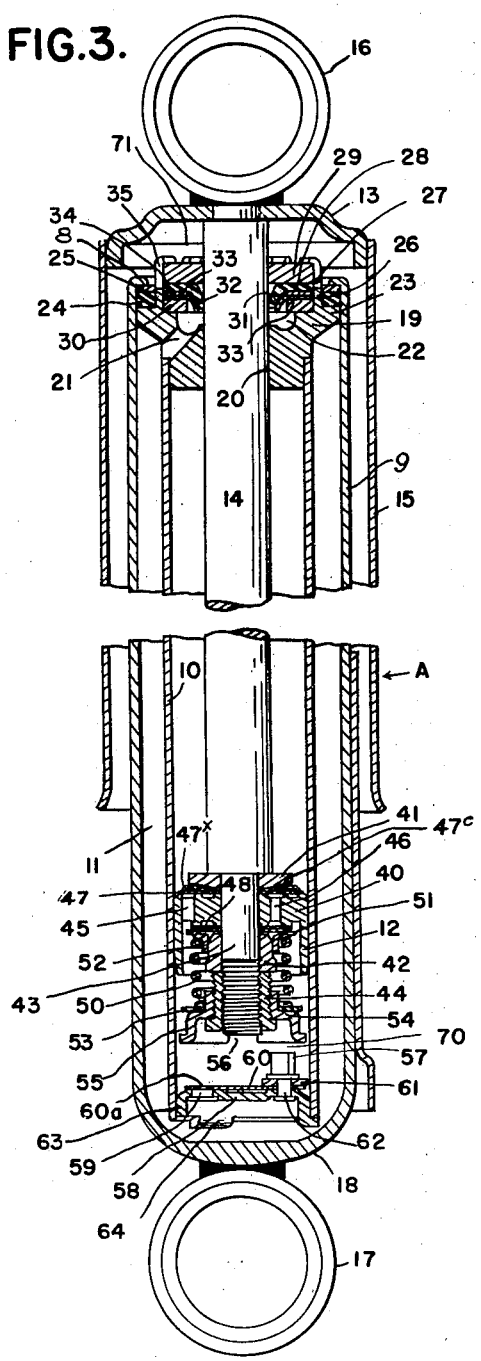
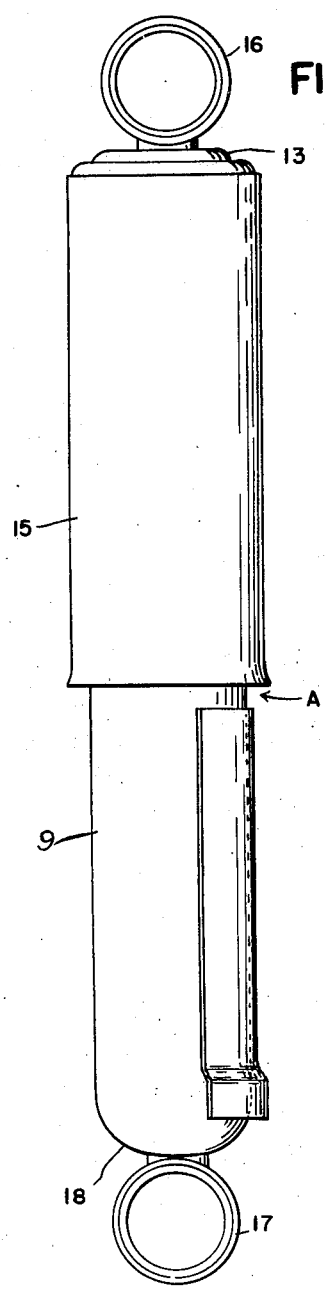
INVENTOR.
ARTHUR BOOR
BY Whittemore Hulbert & Belknap
ATTORNEYS Jan. 4, 1944. A. BOOR 2,338,162
SHOCK ABSORBER
Filed Sept. 5, 1941 2 Sheets-Sheet 2

INVENTOR.
ARTHUR BOOR
BY Whittemore Hulbert + Belknap
ATTORNEYS

Patented Jan. 4, 1944

2,338,162

UNITED STATES PATENT OFFICE 2,338,162

SHOCK ABSORBER

Arthur Boor, Toledo, Ohio, assignor to Monroe Auto Equipment Company, Monroe, Mich., a corporation of Michigan Application September 5, 1941, Serial No. 409,745

21 Claims. (Cl. 188—88)

This invention relates generally to shock absorbers and refers more particularly to improvements in hydraulic shock absorbers of the direct-acting type having a ported piston working in a pressure cylinder in dependence upon relative movement of the parts with which the shock absorber is connected and, in addition, having valve means in association with the piston for regulating the passage of the hydraulic fluid medium through the piston in both directions of movement of the latter in the fluid pressure chamber.

One of the important objects of the invention is to provide an improved guide for the piston rod and improved connections between said guide and the associated parts of the structure.

Another object is to provide a guide of the type mentioned that includes as a part thereof a recess or pocket for receiving the hydraulic medium wiped off the piston rod and that also includes one or more passages for delivering such medium from the recess to the reserve chamber of the shock absorber.

Another object is to provide in association with the guide, and more particularly with the recess thereof, an improved form of seal that not only effectively prevents the escape of the hydraulic medium from the compression chamber via the piston rod, but also serves as a wiper to remove to the chamber in the guide any hydraulic medium adhering to the piston rod.

Another object is to provide an improved mounting for the piston and valves associated therewith.

Another object is to provide a mounting of this type wherein a single coil spring serves effectively to hold the valves in an operative position relative to the piston.

Another object is to provide a mounting that includes as a support for the spring a member, preferably in the form of a slotted plate, that is operable to adjust or vary the tension of the spring.

Another object is to provide an improved compression valve assembly for connection with the compression chamber of the shock absorber.

Another object is to provide a valve assembly of the type mentioned that carries means, preferably in the form of a peg, for engagement with the slotted adjusting plate aforesaid to actuate the same for effecting an adjustment of the spring.

Another object is to provide a shock absorber construction wherein the engagement of the peg with the slotted adjusting plate may be accomplished without taking apart or opening the shock absorber.

Another object is to improve generally shock absorbers of the direct-acting type by simplifying and reducing in number the parts thereof so that the cost of manufacture is materially reduced.

Another object is to provide a shock absorber that not only is capable of effectively controlling the sprung and unsprung weight of a vehicle in both directions of vertical movement thereof, but is durable in construction and will afford highly satisfactory operation over a long period of use.

Other objects, advantages and novel details of construction of this invention will be made more apparent as this description proceeds, especially when considered in connection with the accompanying drawings, wherein:

Figure 1 is an elevation of a shock absorber embodying my invention;

Figure 3 is a vertical sectional view through the shock absorber;

Figure 2:
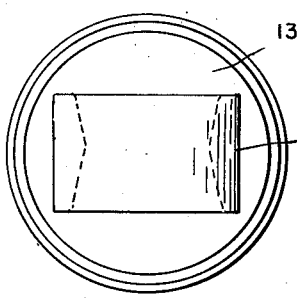
Figure 2 is a top plan view thereof.
Figure 4:
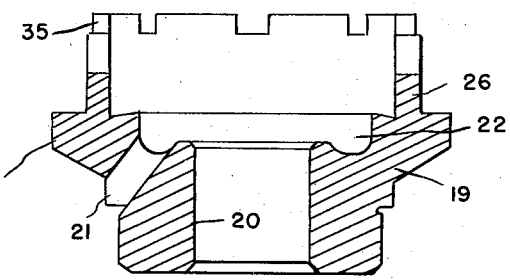
Figure 4, is a detail vertical sectional view through the die casting before the tongues thereof are bent.
Figure 6:
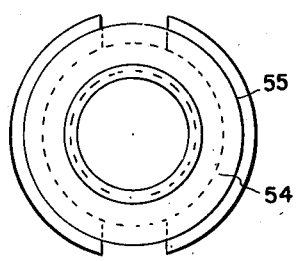
Figure 6 is a top plan view of the adjusting plate for the spring.
Figure 5:
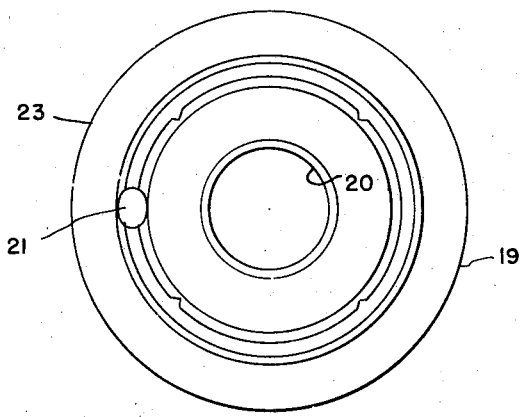
Figure 5 is a top plan view of the structure shown in Figure 4.
Figures 9, 10:
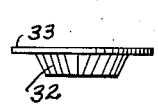
Figure 9 is a top plan view of the finger spring.
Figure 10 is an elevational view of the finger spring.
Figure 7:
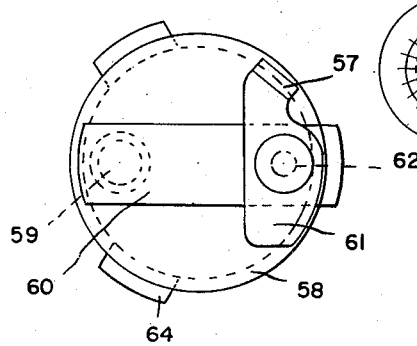
Figure 7 is a top plan view of the compression valve assembly.
Figure 8:
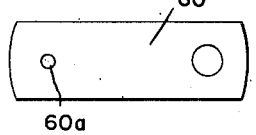
Figure 8 is a detail view of the spring valve 60.

Referring now to the drawings, A is a shock absorber of the direct-acting type embodying my invention and having a tubular pressure cylinder 10, an outer casing member 9 enclosing and cooperating with the pressure cylinder to provide a reserve chamber 11, a piston 12 reciprocating within the pressure cylinder 10, a cover plate 13 above the upper end of and movable relative to the reserve chamber, a rod 14 terminally connected to the piston 12 and cover plate 13, a tubular dust shield 15 carried by the cover plate 13 and substantially concentric with the casing member 9, and heads 16 and 17, respectively, rigid with the cover plate 13 and closed lower end 18 of the casing member 9 and adapted to be connected to the sprung and unsprung weight of a vehicle.

As shown, the upper ends respectively of the pressure cylinder 10 and casing member 9 have a common closure 19 which preferably is in the form of a die casting having a central bore 20 receiving the piston rod 14. The upper end of the pressure cylinder 10 terminates short of the upper end of the casing member 9 and is sleeved upon the lower end of the casting 19 just below a passage 21 that inclines upwardly and inwardly in the casting from the reserve chamber 11 to a recess or well 22 encircling the piston rod 14.

Projecting laterally from the casting 19 just above the inclined passage 21 is an annular flange 23 that forms a seat for a packing unit comprising a gasket 24 of synthetic material and a retaining washer 25, while projecting upwardly from the casting in spaced substantially concentric relation to the piston rod 14 is an upstanding tubular portion 26 that serves as an enclosure and retainer for a seal 27. The casing member 9 is sleeved upon the lateral flange 23 and has at its upper end an inturned flange 8 that is pressed downwardly against the retaining washer 25 for the gasket 24 so that a tight joint between the parts is obtained. Preferably the casing member 9 has a press fit upon the lateral flange 23 of the casting 19 so as to be rigid therewith. Moreover, when the flange 8 is pressed against the washer 25 the gasket 24 is compressed against both the casing member 9 and tubular portion 26 of the casting to hold the parts firmly together.

The seal 27 forms a top or cover for the recess or well 22 and comprises a disk 28 of suitable material clamped between relatively thick metal washers 29 and 30, respectively, within the tubular portion 26 of the casting and provided at the center thereof with a downwardly and inwardly inclined portion 31 that encircles and frictionally engages the piston rod 14. Such inclined portion 31 serves as a wiper to remove to the recess 22 in the casting any hydraulic medium adhering to the piston rod 14 and for this purpose is normally held in operative wiping position by means of fingers 32 of a spring 33 clamped between the metal washer 30 and another metal washer 34 on the underside of the disk 28. Preferably the tubular portion 26 is slotted vertically at its upper end to provide tongues 35, and the upper ends of the latter are crimped over upon the upper metal washer 29 to hold the parts in assembled relation. Thus, the seal 27 will effectively prevent the hydraulic medium escaping from the pressure chamber 10 via the piston rod 14. With my construction the hydraulic medium will be wiped off the piston rod 14 into the recess 22 and then will flow through the passage 21 to the reserve chamber 11.

In the present instance, I have provided an improved mounting for the piston 12 and associated parts. As shown, the head 40 of the piston is disposed between a plate 41 and a tubular member 42 on the reduced lower end portion 43 of the piston rod. Such parts 40, 41 and 42 are sleeved on said reduced portion 43 and are held against displacement by an adjusting nut 44 threadedly engaging the reduced portion of the rod.

As usual, the head 40 of the piston is provided with vertically extending passages 45 and 46, respectively, for the hydraulic medium; however, such passages are controlled by valves 47 and 48, respectively. Preferably the valve 47 for controlling the outer passages 45 is an ordinary single leaf spring or disc type valve normally held by a leaf spring backer 47× in closed position at the upper end of the passages 45 and having openings 47ᶜ registering with the inner passages 46. As shown, both the valve 47 and its spring backer 47× are clamped between the head 40 of the piston and the plate 41. The valve 48 for controlling the inner passages 46 is a laminated spring disc valve normally held by spring 50 in closed position at the lower end of the passages 46 and is small enough to leave the lower ends of the passages 45 uncovered. As shown, the laminated valve 48 is clamped between the head 40 of the piston and the lateral flange 51 of the ring 52 slidably mounted on the tubular member 42.

For yieldingly retaining the parts in an operative position, I have provided a coil spring 50 that encircles the tubular member 42 and the adjusting nut 44 and has opposite ends thereof bearing against a lateral flange 51 of a ring 52 slidably mounted on the tubular member 42 and against a metal washer 53 on an adjusting plate 54 threadedly engaging the nut 44. If desired, the metal washer 53 may be omitted entirely, in which event the adjusting plate 54 would serve as an abutment for the adjacent end of the coil spring 50. Preferably this adjusting plate 54 has a downturned annular flange or skirt 55 provided at substantially diametrically opposite points thereof with downwardly opening slots 56 that are adapted to receive an upstanding peg 57 on a plate 58 at the lower end of the pressure cylinder 10. The plate 58 is a part of a compression valve assembly and for this purpose has an opening 59 therein for the hydraulic medium under the control of a wafer-like spring valve 60. Preferably the valve 60 and the base 61 of the peg 57 are anchored upon the plate 58 by a suitable rivet 62. Such spring valve 60 has a permanent bleed opening 60ª therein to compensate for the displacement of the piston rod 14. It will also be noted that the plate 58 has a downturned annular flange 63 that is secured to the walls of the pressure cylinder 10 and has three equally spaced lips 64 that engage the lower end of said pressure cylinder and rest upon the closed end of the reserve chamber 11. The tension of the spring 50 may be varied without taking apart or opening the shock absorber by merely moving upwardly the head 17, casing member 9 and pressure cylinder 10 as a unit until the peg 57 engages one of the slots 56 and then turning the unit so that the peg 57 will cause the adjusting plate 54 to turn on the nut 44 as aforesaid. In this connection it will be noted that the space 70 between the peg 57 and the lower edge of the downturned flange 55 of the adjusting plate 54 is less than the distance 71 between the crimped-over upper ends of the tongues 35 at the upper end of the casing member 9 and the cover plate 13.

In use, when the heads 16 and 17 move away from one another, the piston 12 travels upwardly in the pressure cylinder 10 and causes the hydraulic medium above the piston to flow downwardly through the passages 46 in the piston and unseat the valve 48 so as to enter the space in the pressure cylinder below the piston. On the upward stroke of the piston the compression valve 60 is unseated to allow the hydraulic medium in the reserve chamber 11 to flow through the opening 59 into the pressure cylinder 10. When the heads 16 and 17 move toward one another, the piston 12 travels downwardly in the pressure cylinder 10 and causes the hydraulic medium below the piston to flow upwardly through the passages 45 in the piston and unseat the valve 47 so as to enter the space in the pressure cylinder above the piston. On the downward stroke of the piston, the compression valve 60 remains seated.

When it is desired to make an adjustment of the plate 54 to vary the tension of the spring 50, the head 17, casing member 9 and pressure cylinder 10 are first moved upwardly as a unit relative to the piston 12 and rod 14 until the peg 57 enters one of the slots 56 in the depending flange 55 of the plate 54, and then are turned relative to said piston 12 and rod 14 to cause the plate 54 to turn on the nut 44. During the upward turning movement of the plate 54 the nut 44 is held in jammed relation against the lower edge of tubular member 42 which in turn is held in jammed relation against the underside of the valve 48, hence the nut 44 is held against movement relative to the portion 43 of the piston rod during adjustment of the plate 54 as aforesaid. Moreover, there is a binding engagement between the threads of the nut 44 and the threads of the portion 43 of the piston rod during the adjustment of the plate 54 that frictionally holds the nut 44 from turning during adjustment of the plate 54.

What I claim as my invention is:

1. In a shock absorber, a piston rod, a tubular pressure cylinder receiving and substantially concentric with said rod, a guide for the rod forming a closure for an end of the cylinder, said guide having an upstanding tubular portion substantially concentric with the rod and provided outside the tubular portion with a lateral flange, a casing member sleeved on and projecting upwardly above the lateral flange in substantially concentric relation to the pressure cylinder, a packing unit on the lateral flange between said casing member and the upstanding tubular portion of the guide, and means preventing the escape of a hydraulic medium from the end aforesaid of the pressure cylinder via said rod including a seal within the upstanding tubular portion of the guide in frictional engagement with the rod.

2. In a shock absorber, a piston rod, a tubular pressure cylinder receiving and substantially concentric with said rod, a guide for the rod forming a closure for an end of the cylinder, said guide having an upstanding tubular portion substantially concentric with the rod and provided outside the tubular portion with a lateral flange, a casing member sleeved on and projecting upwardly above the lateral flange in substantially concentric relation to the pressure cylinder, a packing unit on the lateral flange between said casing member and the upstanding tubular portion of the guide, the upwardly projecting portion of the casing member being peened over upon said packing unit, and means preventing the escape of a hydraulic medium from the end aforesaid of the pressure cylinder via said rod including a seal within the upstanding tubular portion of the guide in frictional engagement with the rod, the upper end of said tubular portion being slotted to provide tongues, and the upper ends of said tongues being crimped over upon said seal and retaining it against displacement from the tubular portion of said guide.

3. In a shock absorber, a piston rod, a tubular pressure cylinder receiving and substantially concentric with said rod, a guide for said rod forming a closure for an end of the pressure cylinder, said guide being provided above said end of the pressure cylinder with a lateral flange and provided above the lateral flange with an upstanding tubular portion substantially concentric with said rod, a casing member sleeved on and projecting above the lateral flange in substantially concentric relation to the pressure cylinder, a seal within said upstanding tubular portion and frictionally engaging said rod, and a packing unit between the upwardly projecting portion of the casing member and the upstanding portion of the guide, a part of the upstanding tubular portion being crimped upon the seal, and a part of the upwardly projecting casing member being peened over upon said packing unit.

4. In a shock absorber, a piston rod having a reduced end portion and a shoulder at one end of said reduced portion, a piston sleeved on said reduced portion, a plate sleeved on the reduced portion between the head of the piston and said shoulder, a nut adjustable on said reduced portion, a tubular member sleeved on the reduced portion between the nut and head of the piston, the head of the piston having two sets of fluid passages therethrough, a spring valve between the plate and head of the piston controlling one set of said passages, a spring valve between the tubular member and head of the piston controlling the other set of said passages, a coil spring encircling the nut and tubular member, and abutments for the ends of the spring carried by the tubular member and nut, one being adjustable to vary the tension of said spring.

5. In a shock absorber, a pressure cylinder, a closure for one end of said cylinder having an outwardly projecting tubular portion and provided outside the tubular portion with a lateral flange, a casing member sleeved on the lateral flange, and a packing unit on the lateral flange between the casing member and tubular portion of the closure.

6. In a shock absorber, a pressure cylinder, a closure for one end of said cylinder having an outwardly projecting tubular portion and provided outside the tubular portion with a lateral flange, a packing unit on the lateral flange outside the tubular portion of said closure, and a casing member sleeved on the lateral flange and extending outside the packing unit, a portion of the casing member being bent downwardly against the packing unit to hold it under compression between the casing member and tubular portion of said closure.

7. In a shock absorber, a piston rod, a tubular pressure cylinder receiving and substantially concentric with said rod, a guide for the rod forming a closure for an end of the cylinder, said guide having an upstanding tubular portion substantially concentric with the rod and provided outside the tubular portion with a lateral flange, a casing member sleeved on and projecting upwardly above the lateral flange in substantially concentric relation to the pressure cylinder, and a packing unit anchored on the lateral flange between the casing member and the upstanding tubular portion of the guide.

8. In a shock absorber, a piston rod, a tubular pressure cylinder receiving and substantially concentric with said rod, a guide for the rod forming a closure for an end of the cylinder, said guide having an upstanding tubular portion substantially concentric with the rod and provided outside the tubular portion with a lateral flange, a casing member sleeved on and projecting upwardly above the lateral flange in substantially concentric relation to the pressure cylinder, and a packing unit on the lateral flange between said casing member and the upstanding tubular portion of the guide, the upwardly projecting portion of the casing member being peened over upon said packing unit.

9. In a shock absorber, a piston rod, a tubular pressure cylinder receiving and substantially concentric with said rod, a guide for the rod forming a closure for an end of the cylinder, said guide having an upstanding tubular portion substantially concentric with the rod and provided outside the tubular portion with a lateral flange, a casing member sleeved on and projecting upwardly above the lateral flange in substantially concentric relation to the pressure cylinder, a packing unit on the lateral flange between said casing member and the upstanding tubular portion of the guide, the upwardly projecting portion of the casing member being peened over upon said packing unit, and means preventing the escape of a hydraulic medium from the end aforesaid of the pressure cylinder via said rod including a seal within the upstanding tubular portion of the guide in frictional engagement with the rod, the upper end of said tubular portion being crimped over upon said seal and retaining it against displacement from the tubular portion of said guide.

10. In a shock absorber, a piston rod having a shoulder, a piston sleeved on said rod, a plate sleeved on the rod between the piston and said shoulder, a nut adjustable on said rod, a tubular member sleeved on the rod between the nut and piston, the piston having two sets of fluid passages therethrough, a spring valve between the plate and piston controlling one set of said passages, a spring valve between the tubular member and piston controlling the other set of said passages, a coil spring encircling the nut and tubular member, and abutments for the ends of the spring carried by the tubular member and nut, one being adjustable to vary the tension of said spring.

11. In a shock absorber, a piston rod, a piston on said rod having a passage therethrough for a hydraulic medium, a leaf spring valve on one side of the piston for controlling the flow of hydraulic medium through said passage, and means determining the action of said valve including a member slidable on the rod against the valve, a nut threadedly engaging said rod and engageable with said member, a plate threadedly engaging said nut and having an annular flange provided with one or more slots for the reception of an actuating member, a coil spring encircling the slidable member and nut, and abutments for the ends of said spring on said slidable member and plate.

12. In a shock absorber, a piston rod, a piston on said rod having a passage therethrough for a hydraulic medium, a leaf spring valve on one side of the piston for controlling the flow of hydraulic medium through said passage, and means determining the action of said valve including a member slidable on the rod against the valve, an element adjustable on said rod and engageable with said member, an element adjustable on the first mentioned element and having a portion provided with one or more slots for the reception of an actuating member, a coil spring encircling the slidable member and first mentioned element, and abutments for the ends of said spring on said slidable member and second mentioned element.

13. In a shock absorber, a piston rod, a piston on said rod having a passage therethrough for a hydraulic medium, a leaf spring valve on one side of the piston for controlling the flow of hydraulic medium through said passage, and means determining the action of said valve including a member slidable on the rod against the valve, an element adjustable on said rod and engageable with said member, an element adjustable on the first mentioned element, a coil spring encircling the slidable member and first mentioned element, and abutments for the ends of said spring on said slidable member and second mentioned element.

14. In a shock absorber, a pressure cylinder, a closure for one end of the cylinder having an opening for hydraulic medium, a wafer-like spring valve controlling said opening and having a bleed opening registering with the opening in said closure, a peg for actuating another element of the shock absorber having a base on the valve, and an element securing the base of the peg and said valve to said closure.

15. In a shock absorber, a pressure cylinder, a closure for the cylinder having an opening for hydraulic medium, a leaf spring valve controlling said opening and having a bleed opening registering with the opening in said closure, a peg for actuating another element of the shock absorber having a base on the valve, and means securing both the base of the peg and said valve to said closure.

16. In a shock absorber, a pressure cylinder, a closure for one end of the cylinder having an opening for hydraulic medium, a fastener carried by the closure in spaced relation to the opening, a spring leaf valve anchored by the fastener to the closure and controlling said opening, and an actuator for another element of the shock absorber anchored by the fastener to the closure in clamping relation to said valve.

17. In a shock absorber, a piston rod having a shoulder, a piston sleeved on said rod, a plate sleeved on the rod between the piston and said shoulder, an adjustable member on said rod in spaced relation to said plate, a tubular member sleeved on the rod between the adjustable member and piston, the piston having two sets of fluid passages therethrough, a valve between the plate and piston controlling one set of said passages, a valve between the tubular member and piston controlling the other set of said passages, a coil spring encircling the adjustable member and tubular member, and abutments for the ends of the spring carried by the tubular member and adjustable member, one being adjustable to vary the tension of said spring.

18. In a shock absorber, a piston rod, a piston on said rod having a passage therethrough for a hydraulic medium, a valve on one side of the piston for controlling the flow of hydraulic medium through said passage, and means determining the action of said valve including a member slidable on the rod against the valve, an adjustable member threadedly engaging said rod and engageable with said slidable member, an element adjustable on said adjustable member and having a portion provided with one or more slots for the reception of an actuating member, a coil spring encircling the slidable member and adjustable member, and abutments for the ends of said spring on said slidable member and adjustable element.

19. In a shock absorber, a pressure cylinder, a closure for one end of the cylinder having an opening for hydraulic medium, a valve controlling said opening, a peg for actuating another element of the shock absorber having a base on the valve, and an element securing the base of the peg and said valve to said closure.

20. In a shock absorber, a pressure cylinder, a closure for one end of said cylinder having an opening for hydraulic medium, a peg for actuating another element of the shock absorber having a base anchored on the closure, and a valve for the opening in the closure held on the latter by the anchorage for the base of said peg.

21. In a shock absorber, a pressure cylinder, a closure for the cylinder having an opening for hydraulic medium, a leaf spring valve controlling said opening, a peg for actuating another element of the shock absorber having a base on the valve, and means securing both the base of the peg and said valve to said closure.

ARTHUR BOOR.